United States Patent
Hogan

(10) Patent No.: US 7,339,871 B2
(45) Date of Patent: Mar. 4, 2008

(54) METHOD FOR ACCURATE POSITIONING OF MARKS AND SPACES ON AN OPTICAL DISC

(75) Inventor: Josh Hogan, Los Altos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 257 days.

(21) Appl. No.: 10/610,933

(22) Filed: Jun. 30, 2003

(65) Prior Publication Data

US 2004/0008599 A1    Jan. 15, 2004

Related U.S. Application Data

(63) Continuation of application No. 09/542,404, filed on Apr. 3, 2000, now Pat. No. 6,631,108.

(51) Int. Cl.
B11B 7/00 (2006.01)
(52) U.S. Cl. .............. 369/53.36; 369/30.21; 369/275.3; 369/275.4; 369/47.53
(58) Field of Classification Search .......... 369/53.35, 369/30.21, 47.5, 59.11, 59.12, 47.19, 53.36, 369/53.1, 59.1, 47.53, 124.04, 53.34, 53.31, 369/53.26, 116, 124.01, 124.11, 124.1, 275.4, 369/275.1, 44.13, 47.28, 47.1, 275.3
See application file for complete search history.

(56) References Cited

U.S. PATENT DOCUMENTS

| | | | | |
|---|---|---|---|---|
| 5,617,399 A * | 4/1997 | Spruit et al. | ............. | 369/47.53 |
| 5,831,943 A * | 11/1998 | Kurita et al. | ............... | 369/116 |
| 5,841,747 A * | 11/1998 | Kubota et al. | ............. | 369/116 |
| 5,852,599 A * | 12/1998 | Fuji | ........................ | 369/275.4 |
| 5,982,718 A * | 11/1999 | Takiguchi | ................ | 369/124.1 |
| 6,031,800 A * | 2/2000 | Narumi et al. | ............. | 369/47.3 |
| 6,157,609 A * | 12/2000 | Shoji et al. | ............. | 369/275.3 |
| 6,160,776 A * | 12/2000 | Seo | ............................ | 369/47.1 |
| 6,310,846 B1 * | 10/2001 | Fuji | ........................ | 369/47.53 |
| 6,359,846 B1 * | 3/2002 | Shoji et al. | ................ | 369/47.5 |
| 6,480,449 B1 * | 11/2002 | Narumi et al. | ........... | 369/47.53 |
| 6,654,331 B1 * | 11/2003 | Wilson et al. | ........... | 369/53.34 |
| 6,721,255 B1 * | 4/2004 | Gushima et al. | ......... | 369/59.12 |

* cited by examiner

*Primary Examiner*—Hoa Thi Nguyen
*Assistant Examiner*—Kim-Kwok Chu

(57) ABSTRACT

An optical disc has spatial features (notches, bumps, etc.) that intentionally distort the analog Read Data signal. For a mark or space that is centered on a spatial feature, the distortion does not affect the resulting binary Read Data signal. If an edge of a mark or space is near the spatial feature, the resulting binary Read Data signal is altered. For calibration, marks or spaces are written adjacent to spatial features, with a range of times for initiating the writes. The result is a range of write times that do not alter the binary Read Data signal. From these known times and spatial locations, it is known when a mark or space must be written to ensure accurate spatial placement.

26 Claims, 7 Drawing Sheets

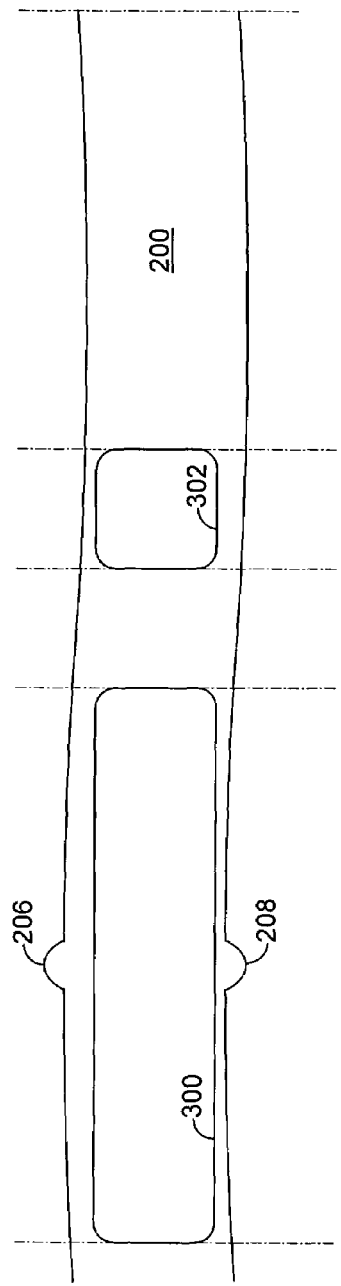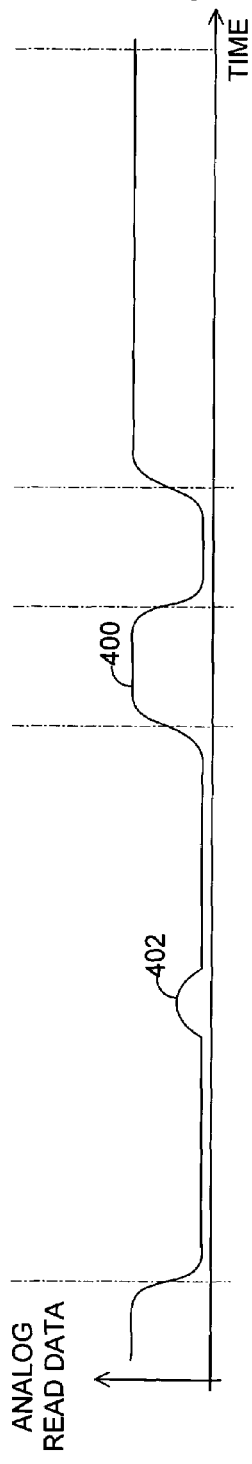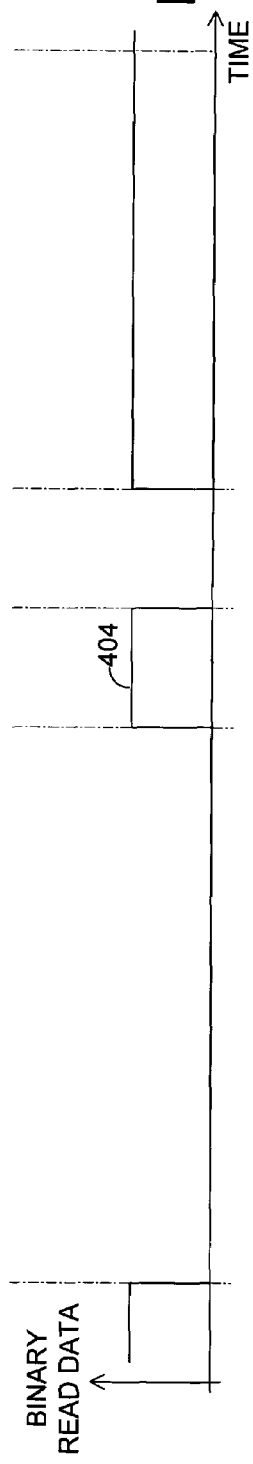

METHOD FOR ACCURATE POSITIONING OF MARKS AND SPACES ON AN OPTICAL DISC

CROSS REFERENCE TO RELATED APPLICATION

This application is a continuation of U.S. patent application Ser. No. 09/542,404, filed Apr. 3, 2000, now U.S. Pat. No. 6,631,108 which is hereby incorporated by reference.

This application is related to co-pending U.S. patent application Ser. No. 09/541,812, filed Apr. 3, 2000, also entitled "METHOD FOR ACCURATE POSITIONING OF DATA MARKS AND SPACES ON AN OPTICAL DISC", which is hereby incorporated by reference.

FIELD OF INVENTION

This invention relates generally to rewritable digital optical discs, and more specifically to using spatial features on a disc to facilitate accurate positioning of data marks and spaces.

BACKGROUND OF THE INVENTION

For rewriteable data media, on which data can be appended to a partially recorded medium, and on which previously written data can be erased and overwritten, data formats commonly provide data gaps for accommodating angular velocity variations between drives, and for accommodating write clock drift. Rewriteable data formats also commonly provide clock synchronization patterns for adjusting the write clock frequency and phase. For example, magnetic discs and tapes are typically formatted into sectors, with each sector including a preamble for synchronizing a write clock, and with each sector including extra space at the end to allow for variations in media velocity. Synchronization patterns and data gaps reduce effective data capacity because they occupy space that could otherwise be occupied by user data.

In contrast, some proposed formats for rewriteable Digital Versatile Discs (DVD) do not have clock synchronization fields or extra space at the end of sectors. One rewriteable DVD format specifies a land and groove structure, with the grooves having a sinusoidal radial displacement (called wobble), and for the particular format, groove wobble is used to synchronize a write clock. In general, data is encoded in the timing of transitions between marks and spaces. The particular format specifies that certain marks must be written within a specified range of spatial positions relative to a spatial zero-crossing of the wobble. There is a need for writing data marks and spaces at precise positions, and to be able to verify the placement precision. In general, the beginning and end of data marks and spaces are defined by edges of a write clock. Accordingly, a necessary first step in controlling placement precision is an accurate synchronized write clock. However, there are various signal path delays that may vary with time and temperature, and signal path delays that may vary from drive to drive. In addition, the impact of these signal path delays may vary depending on the angular velocity at which the disc is written. There is a further need for an ability to control and verify spatial placement precision of data marks and spaces, even with variable unknown path delays.

As discussed above, some optical disc formats have a land and groove structure, with at least one sidewall of the groove having a sinusoidal radial displacement. Groove wobble may be frequency modulated to encode time or address information, or groove wobble may be used to synchronize a write clock. Some optical disc formats provide spatial features, such as notches in groove sidewalls, that are used for index marks, sector addresses, or for additional phase control of a write clock. See, for example, U.S. Pat. No. 5,933,411 (Inui et al.), and U.S. Pat. No. 5,852,599 (Fuji). See also, for example, M. Yoshida et al., "4.7 Gbyte Rewritable Disc System Based on DVD-R System", *IEEE Transactions on Consumer Electronics*, Nov. 1, 1999, v 45, n 4, pp 1270-1276 (Yoshida et al.).

FIG. 1 (prior art) illustrates a representative example disc drive. In the following discussion of FIG. 1, it will be seen that an accurate clock is a necessary but insufficient condition for precise spatial placement of marks. One must also compensate for various signal path delays.

In many optical disc drives, a single optical detector is used to generate a data signal, a radial position error signal, a focus error signal, and perhaps a wobble signal. FIG. 1 illustrates various lumped path delays for an optical disc drive using one optical detector for multiple functions. In FIG. 1, a light spot 100 is focused onto a data layer of an optical disc. Light reflected from the disc passes through various optical components before being detected by an optical detector 104. In FIG. 1, optical path delays between the disc and the detector 104 are lumped as Delay 1 (102). As depicted in FIG. 1, the optical detector 104 is divided into four sections (A,B,C,D), with each section providing a separate signal. The sum of the four signals (A+B+C+D), with some electronic filtering and processing, is the analog Read Data signal (108). Read Data signal path delays, due to filtering and other electronic processing, are lumped as Delay 2 (106). The analog Read Data signal 108 is received by an analog comparator 130, and compared to a reference voltage. The binary output of the analog comparator is the binary Read Data signal 132.

A radial position error signal, called a Radial Push-Pull (RPP) signal, is derived by subtracting appropriate pairs of the quad detector signals, for example (A+D)−(B+C). For media with wobbled grooves, the wobble signal is a high frequency modulation of the relatively low frequency RPP signal. In FIG. 1, various electronic filtering and processing delays for the RPP/wobble signal are lumped as Delay 3 (110). If the wobble signal is used for synchronization of a write clock signal, the wobble signal is typically received by a Phase-Locked Loop (PLL, 112). The output of the PLL is used for a Write Clock (114). A Write Data signal (116) is synchronized to edges of the Write Clock (114), as controlled by a latch 118 to generate a Write Intensity signal (120). A Laser Intensity circuit 126 is controlled either by the Write Intensity signal (120) or by a Read Intensity signal, and the Laser Intensity circuit then controls the intensity of a laser diode light source. In FIG. 1, path delays in driving the Laser Intensity circuit, as well as any optical path delays are lumped as Delay 4 (128).

Typically, Delay 1 and Delay 4 are negligible. Delay 2 and Delay 3, however, are significant, and both may vary with time and temperature, and may vary from drive to drive. The relative effects of these delays also varies with the angular velocity of the disc. For example, if a disc is partially written in a drive at 1× angular velocity, and rewritten in a drive at 2× angular velocity, the delays have a different effect for the 2× drive relative to the 1× drive.

Consider the problem of writing a new mark at a precise spatial position relative to a spatial zero-crossing of wobble, or writing a new mark relative to an existing mark. One could detect a zero-crossing in a wobble signal, wait the proper number of Write Clock (114) cycles, and write the beginning of the new mark. Alternatively, one could detect the end of an existing mark using the Read Data signal (108), wait the proper number of Write Clock cycles, and write the beginning a new mark. Typically, wobble zero crossings or mark edges would be averaged over many transitions using a phase-locked loop. The proper number of Write Clock cycles may be known for calibrated drives, but may vary over time and may vary from drive to drive. The problem is that if Delay 2 (106), Delay 3 (110), and delay in the PLL 112 are unknown and variable, then there is uncertainty in the time at which a new mark should be written relative to a wobble signal, as sensed in the RPP signal, or relative to an edge of an existing mark, as sensed in the binary Read Data signal. As a result, there is some variation, in the spatial position of the new mark relative to spatial wobble, or in the spatial position of the new mark relative to the existing mark, or the new mark, that may be sufficient to cause a data error during reading. If a leading edge of a new mark is to be precisely spatially located relative to a spatial zero-crossing of wobble, or relative to the trailing edge of an existing mark, the system must compensate for Delay 2, and Delay 3, and the delays in the PLL 112 and the latch 118.

Consider, for example, Fuji (cited above) and Yoshida et al. (cited above). In Fuji, and in Yoshida et al., spatial features are used to synchronize a write clock. However, as discussed above, accurate write clock generation is necessary but not sufficient. The write clock is only part of the problem. An accurate clock enables relative precision, so that a mark may be written consistently at some latency after detecting a feature in the read signal or wobble signal, but the latency is unknown and may vary over time and from drive to drive. In proposed specifications for rewriteable DVD with a 4.7 Gbyte capacity per writing surface, an absolute spatial position accuracy is required. Specifically, in one proposed standard, certain specified marks must be spatially placed within ±5 channel bits of the spatial zero crossing of a spatial wobble having spatial period of 32 channel bits.

There is need for a capability to verify that marks have been spatially placed relative to a spatial wobble within a certain tolerance. There is a further need for a drive to be able to place marks at precise absolute spatial positions.

SUMMARY OF THE INVENTION

Spatial features (notches, bumps, etc.) are implemented such that they intentionally distort the analog Data Read signal. If a transition between a mark and a space is not near a groove feature, the distortion does not affect the resulting binary Read Data signal. In contrast, if a transition between a mark and a space is near the groove feature, the timing of the resulting binary Read Data signal is affected significantly (sufficient to cause a data read error). For calibration, marks or spaces are written adjacent to spatial features, and the timing of the Write Data signal is adjusted while monitoring data read errors. Long marks and spaces within Sync codes may be used for calibration. Sync codes are convenient because they include the longest permitted marks and spaces, they occur regularly throughout the disc, and they are positioned outside error correction blocks. Alternatively, predetermined data sets may be used, for which the error rate as a function of write time has been characterized. For either long marks and spaces within sync codes, or data sets, from the calibration procedure, it is known when an edge of a mark or space must be initiated in the Write Data signal in order to spatially place a mark or space at a known spatial location relative to a spatial feature. Given a mark or space at a known spatial location, the delay between detection of a zero-crossing in a wobble signal and the time of writing the mark may be determined. Alternatively, given a mark or space at a known spatial location, the delay between a spatial edge of a mark or space and the time at which the edge is detected in the binary Read Data signal may be determined. From these known times and spatial locations, it is known when a mark or space must be written relative to detection of a zero-crossing in a wobble signal to ensure accurate placement relative to a zero-crossing in the spatial wobble. From these known times and spatial locations, given detection of edges of existing marks and spaces in the binary Read Data signal, it is known when a new mark or space must be initiated in order to place the new mark or space at an accurate location relative to an existing mark or space. The calibration method may be performed at any angular velocity.

BRIEF DESCRIPTION OF THE DRAWINGS

FIG. 4A is a plan view of a disc, with a spatial feature as illustrated in FIG. 2 and further illustrating a data mark centered on the spatial feature.

FIG. 4B is a waveform of an analog data signal resulting from the marks and spaces illustrated in FIG. 4A.

FIG. 4C is a waveform of a binary data signal resulting from the marks and spaces illustrated in FIG. 4A.

DETAILED DESCRIPTION OF THE PREFERRED EMBODIMENT OF THE INVENTION

Figure 1:
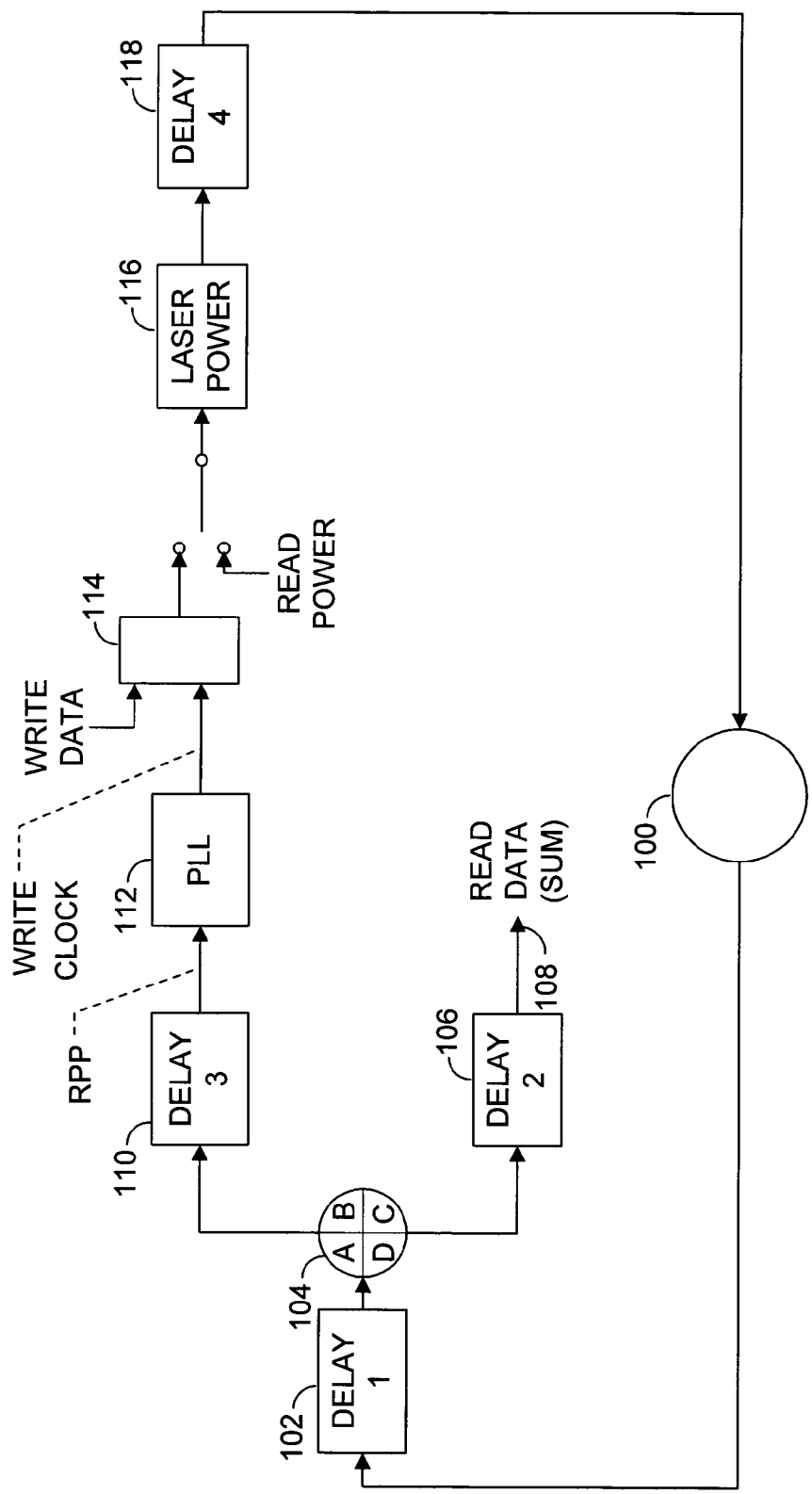
FIG. 1 (prior art) is a block diagram of a typical optical disc drive illustrating various signal path delays.

The light received at the surface of the detector array is not uniform, but instead comprises interference patterns, resulting in an intensity distribution. Binary data are encoded as transitions between areas of contrasting reflectance, or by pits and lands that affect the phase (and interference patterns) of the reflected light. Rewriteable optical disc media commonly use a phase change material in a recording layer. During writing, the phase change material becomes crystalline when heated to just below its melting point and then cooled at a relatively slow rate, and amorphous when heated above its melting point and then cooled quickly. Data marks and spaces are formed by using focused laser light to heat small areas of the phase change material to one of two levels, and then allowing the material to cool. Crystalline areas typically reflect more light than amorphous areas. For purposes of illustration, in the following discussion, the disc before writing is assumed to be crystalline, data marks are assumed to be amorphous, and crystalline areas are assumed to reflect more light than amorphous areas.

During reading, the focused laser spot on an optical disk typically has a central area of relatively high intensity, and several side lobe rings having a much lower intensity. For media with lands and grooves, the central area of high intensity has an overall diameter sufficiently large such that when the center of the spot is centered on a groove, some light falls onto each adjacent land. The land and groove structure acts as a diffraction grating, and many orders are diffracted from the disc. The size of the pupil of the objective lens, and the track pitch, determine how many orders are reflected from the disc and how many orders interfere with the 0th diffracted order (the central spot). Amorphous areas reflect less light than crystalline areas, but the analog Read Data signal is also affected by interference patterns. Because of the interference patterns, increasing the width of the groove may result in an increase in overall intensity at the sensor, or may result in a decrease in intensity at the sensor, depending on factors such as the depth of the groove relative to the lands, track pitch, and so forth. Depending on the groove depth and track pitch, notches, at the depth of the grooves, into the lands, may affect the interference patterns such that the Read Data signal level is reduced or increased. Similarly, depending on the groove depth and track pitch, protrusions, at the height of the lands, into the groove, may affect the interference patterns such that the Read Data signal level is reduced or increased. Similarly, bumps or pits that change the depth of the groove relative to the lands may change the interference pattern so as to increase, or decrease, the analog Read Data signal level. In the following discussion, notches into the lands are used to illustrate an example of spatial features that affect the analog Read Data signal, but, in general, protrusions into the groove, or bumps, or pits, may also be used. In the following discussion, it is assumed that increasing the width of the groove, for example by placing notches into the lands, change the interference pattern such that the analog Read Data signal level is increased. Accordingly, notches in the lands are assumed to increase the analog Read Data signal when reading an amorphous area (low reflectivity).

Figure 2:
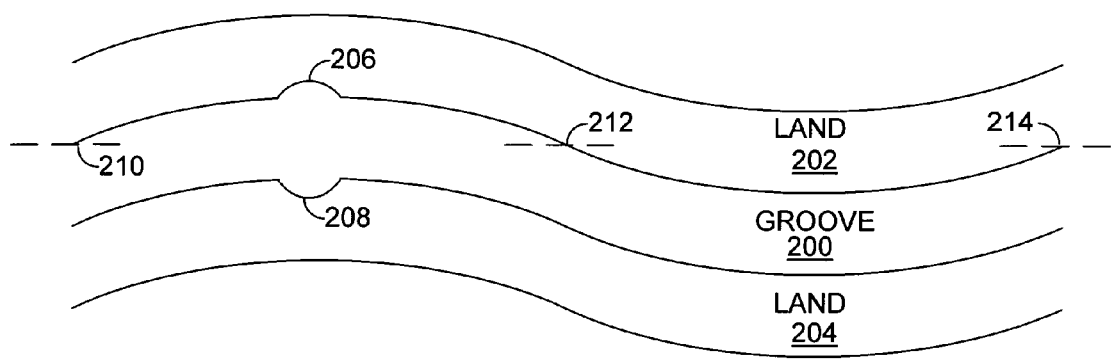
FIG. 2 is a plan view of a disc, illustrating a spatial feature in a wobbled groove, in accordance with the invention.

FIG. 2 illustrates an expanded portion of an example embodiment of an optical disc in accordance with the invention, with a radially symmetrical wobbled groove 200 between two lands 202 and 204. The wobble in FIG. 2 is exaggerated to facilitate illustration. Groove 200 has two spatial features (width modulations) 206 and 208. The groove wobble has spatial zero-crossings at references 210, 212, and 214. Recall from the discussion of FIG. 1 that the radial tracking error signal (RPP) is a differential signal. If the spatial features 206 and 208 are radially symmetrical, the changes to the interference pattern are radially symmetrical, and the differential RPP signal, (A+B)−(C+D), is not affected by the spatial features. However, as discussed above, increasing the groove width, for example notches into the lands as illustrated in FIG. 2, causes the overall intensity at the sensor to increase.

Drives implementing the invention can determine when a transition between a mark and a space is positioned near a spatial feature. This information may be used to verify that the spatial position of a mark or space is within a specified tolerance relative to a zero-crossing of a spatial wobble. Alternatively, this information may be used to calibrate the write channel so that marks and spaces can be written within a specified tolerance. By varying the write time for a mark or space, a range of write times can be determined for which the end of the mark or space is not near a spatial feature. This range of times can be used to determine a write time that results in a mark or space being precisely spatially centered relative to a spatial feature, and that information may be used to compensate for various signal delays in order to write a mark or space at a precise spatial location. In particular, the invention is not limited to discs having wobbled grooves, but instead is applicable in general to placing marks or spaces relative to a spatial feature.

To facilitate illustration, in the following discussion, wobbled grooves are used as an example of a way to synchronize the Write Clock. In particular, wobbled lands and grooves are part of several DVD standards. However, the invention is not limited to wobbled grooves. The data for the Write Clock may, for example, come from dedicated clock tracks, may come from another layer of the disc, or may come from sources other than wobble. Some media do not use grooves. The spatial features may be radially asymmetrical. For example a spatial feature may be on only one side of a groove. However, if wobble is used for the reference for the Write Clock, then preferably the spatial features are radially symmetrical to avoid distortion of the wobble signal.

In the following discussion, one specific standard DVD data format is used for illustration. However, there are multiple alternative proposed DVD data formats, and the invention is applicable to many alternative optical disc data formats. Information is typically encoded on a disc by using a run-length-limited modulation code. Such a code allows marks, and spaces between marks, to have several possible spatial lengths. All permitted spatial lengths are commonly expressed in terms of multiples of a length referred to as a channel bit. As the disc rotates relative to the optical transducer, spatial frequencies on the disc are translated into temporal frequencies in various signals from the optical transducer. It is common for one temporal cycle of the Write Clock to correspond to the time required for a distance on the disc of one channel bit to rotate past the optical transducer. In particular, in the time domain, one cycle of the Write Clock is commonly referred to as "T", and the time of the various marks and spaces are described in multiples of "T". In the specific example DVD format, the groove is radially symmetrically wobbled with a wobble period of 32 channel bits. That is, the Write Clock frequency is 32 times the wobble signal frequency.

For one common DVD standard, a channel bit has a length of 0.133 micrometers. The shortest mark or space is 3 channel bits long (0.400 micrometers), and the longest mark or space is 14 channel bits long (1.866 micrometers). In the example DVD format, data is encoded using marks and spaces that are 11 channel bits long or shorter, and the longest (14 channel bits) mark or space is used only in a "Sync Code". The longest (14 channel bits) marks and spaces occur regularly every 1,488 channel bits, and only at that regular interval. Every longest mark or space is followed by a shortest (3 channel bits) mark or space. In the example DVD format, data is formatted into blocks having error correction, called ECC blocks, but Sync Codes occur outside the ECC blocks.

Figure 3A:
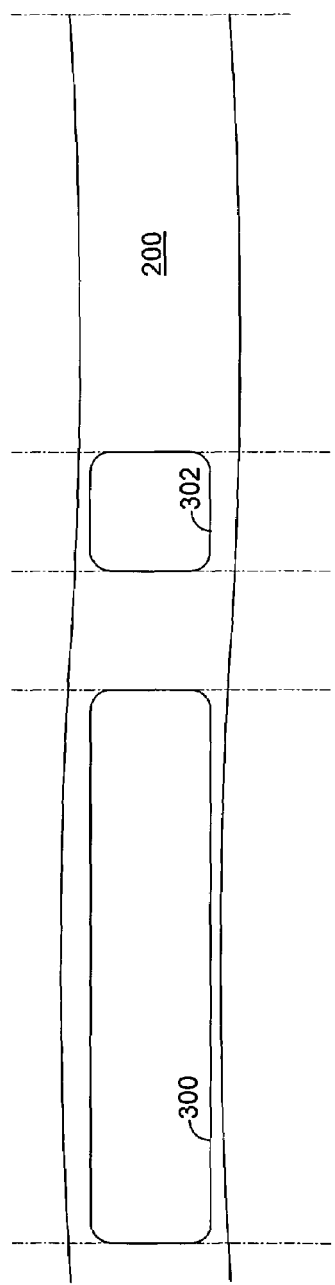
FIG. 3A is a plan view of a disc with a wobbled groove as in FIG. 2, and further illustrating data marks and spaces in the wobbled groove.
Figure 3B:
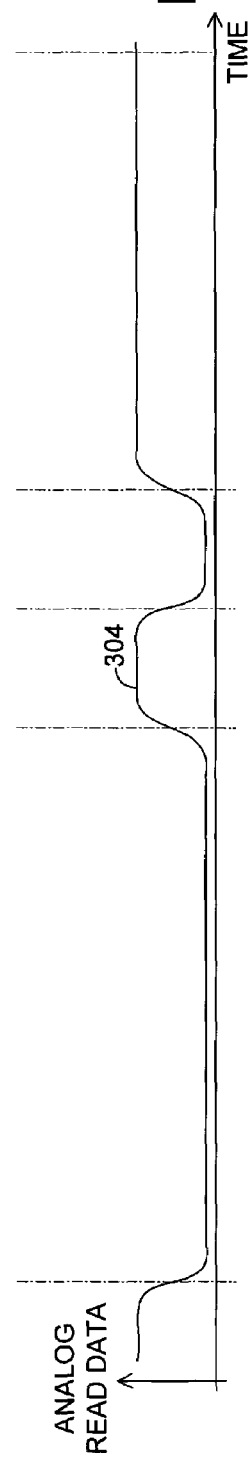
FIG. 3B is waveform of an analog data signal resulting from the marks and spaces illustrated in FIG. 3A.
Figure 3C:
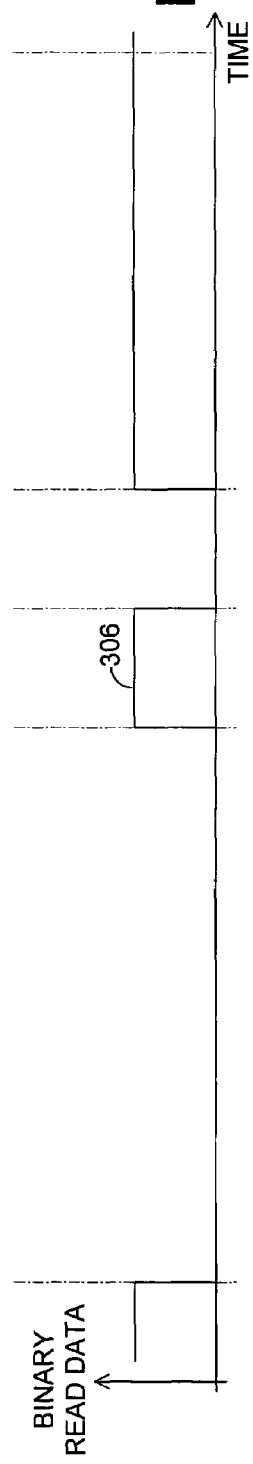
FIG. 3C is a waveform of a binary data signal resulting from the marks and spaces illustrated in FIG. 3A

FIG. 3A illustrates a longest mark 300 and a shortest mark 302 in a wobbled groove, where the mark 300 is 14 channel bits long and the spatial period of the wobble is 32 channel bits. Recall from the discussion above that as the disc rotates, spatial frequencies on the disc are translated into temporal frequencies in various signals from the optical transducer. Accordingly, FIG. 3B illustrates a temporal analog Read Data signal 304, and FIG. 3C illustrates a binary Read Data signal 306, resulting from the marks and spaces illustrated in FIG. 3A. To facilitate illustration, no signal delay is illustrated in FIGS. 3B and 3C. Note that the analog Read Data signal 304 decreases in amplitude when the amorphous mark area passes under the objective lens, resulting in a decrease in reflected light from the data layer, and further resulting in a decrease in the overall intensity of the light propagating to the sensor.

FIG. 4A illustrates a longest mark 300 and a shortest mark 302 in a wobbled groove, with spatial features 206 and 208 in the groove walls. In FIG. 4A, the longest mark 300 is centered lengthwise relative to the spatial features. FIG. 4B illustrates the temporal analog Read Data signal 400 resulting from the spatial marks and spaces and spatial features illustrated in FIG. 4A. To facilitate illustration, no signal delay is illustrated in FIG. 4B. Waveform 400 has a bump 402 corresponding to the spatial features 206 and 208. The spatial features are designed so that when a transition between a mark and a space is not close to the spatial features, the resulting bump in the analog Read Data signal does not exceed the reference voltage to the comparator (FIG. 1, 130), so that the resulting binary Read Data signal (FIG. 1, 132) is not affected. This is illustrated in FIG. 4C, where the resulting binary Read Data signal 404 is not affected by the spatial features 206 and 208.

Figure 5A:
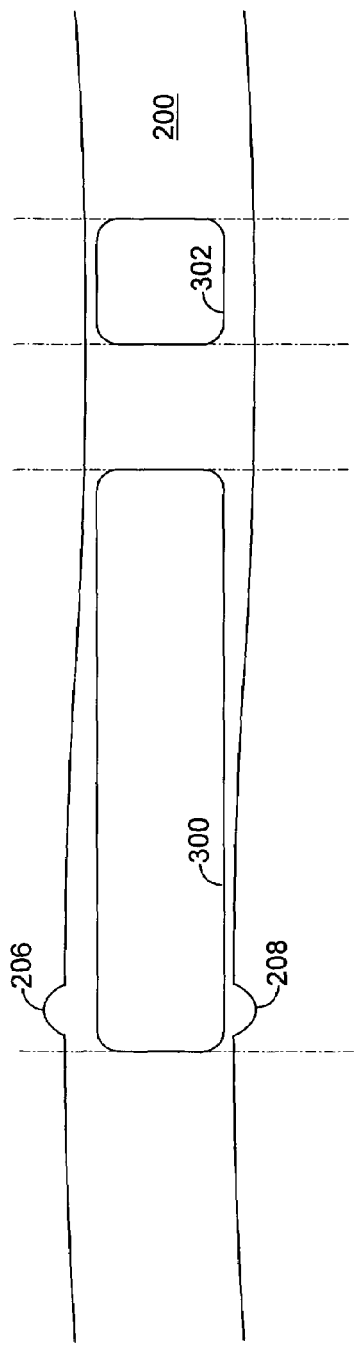
FIG. 5A is a plan view of a disc, with a spatial feature as illustrated in FIG. 2, and further illustrating a transition, between a data mark and a space, near the spatial feature.
Figure 5B:
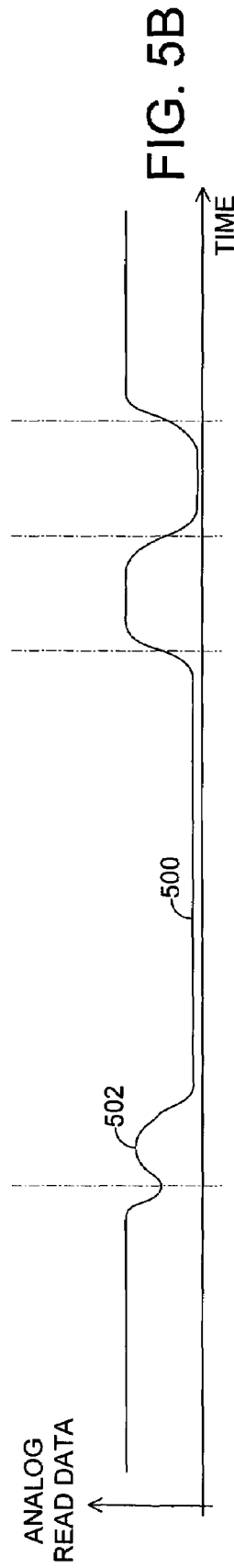
FIG. 5B is a waveform of an analog data signal resulting from the marks and spaces illustrated in FIG. 5A.
Figure 5C:
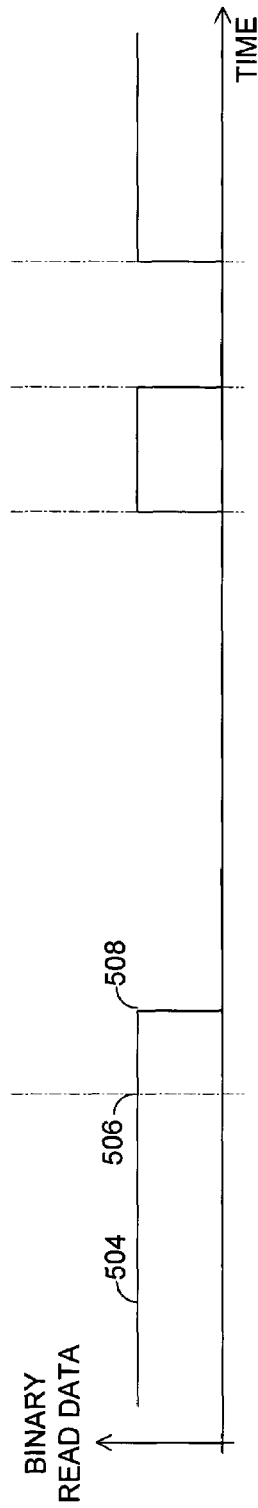
FIG. 5C is a waveform of a binary data signal resulting from the marks and spaces illustrated in FIG. 5A.

FIG. 5A illustrates a longest mark 300 and shortest mark 302, with a transition, between a space and the longest mark, near the spatial features 206 and 208. FIG. 5B illustrates the temporal analog Read Data signal 500 resulting from the marks and spaces and spatial features illustrated in FIG. 5A. To facilitate illustration, no signal delay is illustrated in FIG. 5B. In FIG. 5B, at reference 502, just as the analog Read Data signal starts to fall in response to the transition to the data mark 300, the spatial features cause a rise in the signal. As a result, the point at which the analog Read Data signal drops below the reference voltage for the comparator (FIG. 1, 300) is substantially delayed. This is illustrated in FIG. 5C, where the binary Read Data signal 504 should have a falling edge at the time indicated by reference 506, but instead the falling edge is delayed until the time indicated by reference 508. Alternatively, the analog Read Data signal may temporarily fall below the reference voltage, then exceed the reference voltage during the bump, and then fall below the reference voltage again. In either case, when the binary Read Data signal is processed, the timing of at least one transition in the binary Read Data signal, and the duration of at least one mark or space as seen in the binary Read Data signal, are incorrect, and a read error will occur.

As discussed above, for other media designs, it may be appropriate for the spatial features to protrude into the groove, making the groove more narrow instead of wider. In general, data may be recorded on the lands and in the grooves, or the media may not use lands and grooves, or marks may be more reflective than spaces, or marks may be changes in height of the recording surface (pits or bumps). The spatial features may have straight sides instead of curved sides. Alternatively, the spatial features may be changes in the height of the data recording surface (pits or bumps), or anything else that affects the total intensity of light at a photo detector. The primary requirement is that the spatial features must affect the timing of a transition of the binary Read Data signal if a transition between a mark and a space is near the spatial feature, but must not be detectable in the binary Read Data signal if a transition between a mark and a space is not near a spatial feature. Preferably, the spatial features have little effect on the RPP signal, and little effect on the signals from adjacent tracks. Accordingly, in general, marks, or spaces, or both, may be used for verification and calibration.

Figure 6:
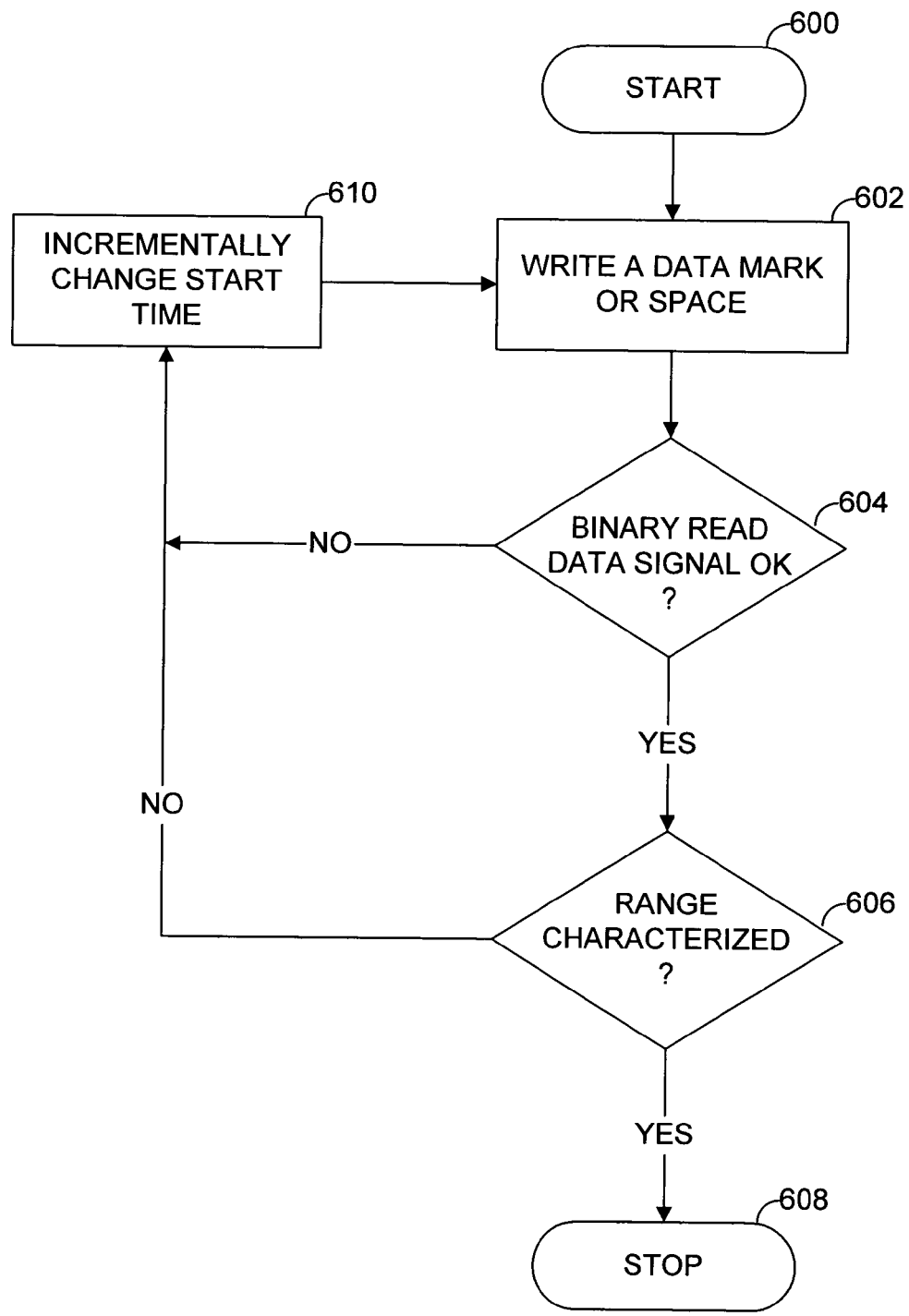
FIG. 6 is a flow chart of a first example method in accordance with the invention.

FIG. 6 illustrates one example calibration method in accordance with the invention. Data marks (or spaces) are written near spatial features (step 602). There may be many spatial features so that averaging may be used to reduce noise. For each mark (or space), the binary Read Data signal resulting from the mark (or space) is evaluated (step 604). Evaluation may comprise observing whether or not the mark (or space) results in a read error. Alternatively, evaluation may comprise measuring the time duration of the mark (or space) as detected in the binary Read Data signal. Marks (or spaces) are repeatedly written or rewritten, while adjusting the timing of the Write Data signal (step 610), until a range of write start times is determined, for which the binary Read Data signal is not affected. The method may, for example, determine a write time at which the time can be shifted ±5T without causing read errors. Alternatively, the method may determine a range of Write Data transition times for which the binary Data Signal is not affected, bounded by Write Data transition times where the binary Read Data signal is affected. A time halfway between the times that result in distorted binary Read Data signal, results in a mark or space that is centered on the spatial features.

In FIGS. 4A and 5A, only longest (14T) marks were illustrated near spatial features. The longest marks and spaces are particularly convenient, first because their length enables a calibration scheme that can compute offsets on the order of ±5T, second because the longest marks and spaces occur at regular positions within the data, and third because the longest marks and spaces occur outside ECC blocks (within Sync Codes). In general, however, marks and spaces of any length can be used. In general, marks and spaces of any length may be used. However, if the optical system cannot resolve a length much shorter than a 3T mark or space, a spatial feature may need to be on the order of 2T in length to be detectable by the optical system. In a specific embodiment, the spatial features are about 2T in length. Therefore, the marks and spaces used for calibration may need to be longer than 3T. In practice, because of various tolerances, it may be desirable to use longer readily available marks such as 9T or 10T.

Figure 7:
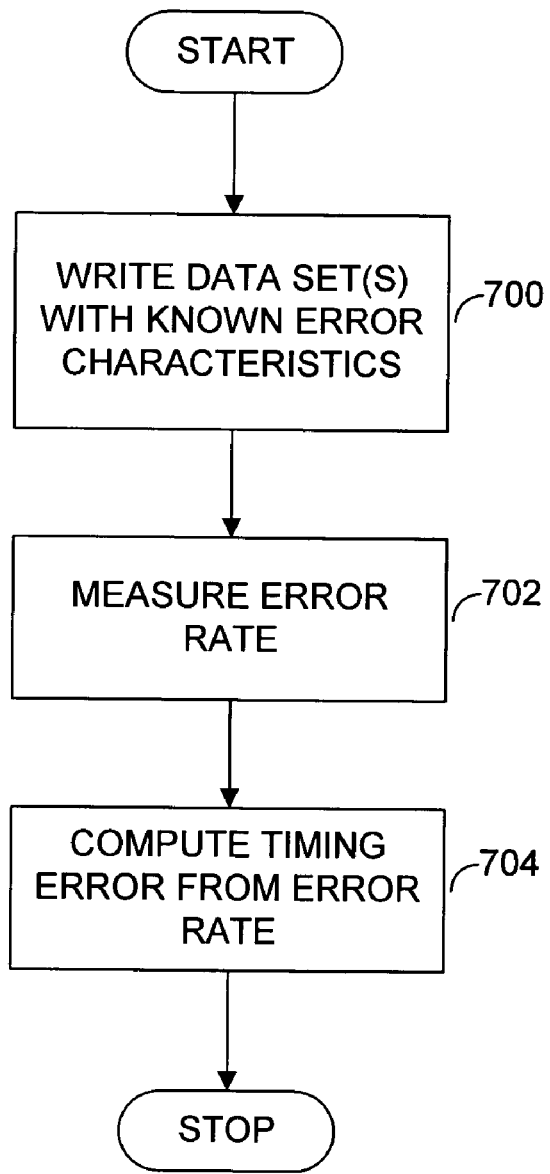
FIG. 7 is a flow chart of a second example method in accordance with the invention.

FIG. 7 illustrates a method in which entire data sets are used for calibration, using marks and spaces of variable lengths. A disc may be manufactured with spatial features arranged in accordance with a pre-determined data set. The error rate for the pre-determined data set may be characterized as a function of timing of the Write Data signal, when the data set is written in the area containing the spatial features. For example, if spatial features are arranged for a range of mark and space lengths, when the write timing is off by 2T, errors may start to occur for 9T marks and spaces, and when the write timing is off by 3T, errors may start to occur for 10T marks and spaces, and so forth. Note that although many of the errors may be automatically corrected, the error correction system may report the number of errors corrected. This information may or may not be available outside the drive mechanism, but drives typically have access to the number of errors.

At step 700, the pre-determined data set is written at the location on the disc having spatial features. At step 702, the error rate for the data set is measured. At step 704, the error rate is compared to prior characterization of error rate as a function of timing of the Write Data signal. As a result, the magnitude of the timing error is known, but not the sign. The timing of the Write Data signal may then be adjusted by the magnitude determined at step 704, and the method of FIG. 7 repeated. If the error rate is worse, the timing was adjusted in the wrong direction and the timing adjustment may be reversed.

There are many alternatives for using characterized data sets as generally illustrated in the method of FIG. 7. For example, a set of predetermined data sets may be defined, with the following characteristics. A first data set may be designed so that a non-zero predetermined error rate occurs when the write timing is ideal, and error rate may increase when timing is shifted in one direction, and error rate may decrease when timing is shifted in the opposite direction. A second data set may be designed with the opposite characteristics from the first data set, so that error rate increases in the timing offset direction in the opposite direction from the first data set. For example, when the write timing is ideal, the first data set may have a predetermined number of marks (or spaces) with leading edges aligned with spatial features, and the second data set may have the predetermined number of marks (or spaces) with trailing edges aligned with spatial features. A third data set may be designed so that an ideal write timing results in zero error rate, and the error rate increases for a timing shift in either direction from the ideal timing. By accumulating the error rate for all three data sets, and repeating the procedure many times, noise is reduced and high accuracy is achieved.

Given a mark or space at a known spatial location, as in FIG. 4A, the delay between a spatial edge of a mark or space and the time at which the edge is detected in the binary Read Data signal (FIG. 1, 132) may be determined. From the calibration procedure, it is known when a transition between a mark and a space must be initiated in the Write Data signal (FIG. 1, 116) in order to place the mark or space at a known spatial location. From FIG. 1, the calibration procedure determines {(Delay 3) plus (delay in the PLL and write circuitry)} and (Delay 2). From these known times, given detection of a zero-crossing in a wobble signal, it is known when a mark or space must be written to ensure a spatial accuracy relative to a spatial zero-crossing in the spatial wobble. Alternatively, from these known times, given detection of edges of existing marks and spaces in the binary Read Data signal, it is known when a new mark or space must be initiated in order to place the new mark or space at an accurate location relative to an existing mark or space. Note in particular that the calibration method may be performed at any angular velocity.

The spatial features for verification and calibration may be confined to a special calibration area of the disc. For example, for rewriteable CD's and DVD's, it is common to dedicate an area (called a Power Calibration Area) at an innermost radius of the disc, for calibration of laser power, specifically for each medium. Each time a new medium is inserted, or each time a drive is powered on with a disc inserted, laser power is calibrated for the specific inserted disc. The Power Calibration Area may also be used for signal delay verification and compensation, with spatial features placed only in the Power Calibration Area. Alternatively, as discussed above, the longest (14 channel bits) mark or space is used only within Sync Codes. The longest (14 channel bits) marks and spaces occur regularly every 1,488 channel bits, and only at that regular interval. Accordingly, spatial features may be placed regularly every 1,488 channel bits. In particular, if spatial features are placed throughout the disc at the location of the longest marks and spaces with the Sync Codes, then spatial accuracy of writing can be verified periodically as a read-after-write process.

Note that in the above discussion, the emphasis has been on rewriteable media. However, the invention is equally applicable to write-once media. Spatial features may be used for write-once media just as described for rewriteable media. Calibration of spatial position may be performed as discussed above, requiring only that each mark or space for calibration can only be written once.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method, comprising:
   writing a data set, with a write timing, at an area on an optical disc that has spatial features that distort an analog read data signal, the distortion varying as a function of write timing, where the data set has a characterized read error rate as a function of write timing at the area that has the spatial features;
   reading the data set from the optical disc;
   determining a read error rate for the data set; and
   adjusting the write timing based on comparing the read error rate of the data set and the characterized read error rate as a function of write timing to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

2. The method of claim 1, comprising:
   observing whether the read error rate increases when write timing is shifted in one direction.

3. The method of claim 1, further comprising:
   observing whether the read error rate decreases when the write timing is shifted in one direction.

4. The method of claim 1, further comprising:
   repeating the steps of writing a data set, reading the data set, and determining a read error rate for the data set, multiple times.

5. The invention of claim 1 further comprising means for observing whether the read error rate increases when write timing is shifted in one direction.

6. The method of claim 1 further comprising means for observing whether the read error rate decreases when the write timing is shifted in one direction.

7. The method of claim 1 further comprising means for repeating the steps of writing a data set, reading the data set, and determining a read error rate for the data set, multiple times.

8. The invention of claim 1 further including the step of adjusting the write timing to provide a mark or space that is precisely spatially centered relative to said at least one spatial feature.

9. A method comprising:
writing a data set, with a write timing, at an area on an optical disc that has spatial features arranged in accordance with the data set;
reading the data set from the optical disc;
determining a first read error rate for the data set;
adjusting the write timing;
writing the data set at the area on the optical disc that has spatial features;
reading the data set from the optical disc;
determining a second read error rate for the data set;
selecting a lowest read error rate among the first and second read error rates; and
choosing a write timing corresponding to the lowest read error rate to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

10. The invention of claim 9 further including the step of choosing the write timing to provide a mark or space that is precisely spatially centered relative to said at least one spatial feature.

11. A method, comprising:
writing a data set, with a write timing, at an area on an optical disc that has spatial features arranged in accordance with the data set;
reading the data set from the optical disc;
determining a read error rate for the data set;
adjusting the write timing to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature; and
repeating the preceding steps until the read error rate is less than a predetermined value.

12. The invention of claim 11 further including the step of adjusting the write timing to provide a mark or space that is precisely spatially centered relative to said at least one spatial feature.

13. A method, comprising:
writing a first data set, with a write timing, at an area on an optical disc that has spatial features that distort an analog read data signal, the distortion varying as a function of write timing;
writing a second data set, with the write timing, at an area on the optical disc that has spatial features that distort an analog read data signal, the distortion varying as a function of write timing;
reading the first data set and the second data set from the optical disc;
determining a first read error rate for the first data set, and a second read error rate for the second data set;
comparing the first and second error rates; and
adjusting the write timing based on the comparison of the first and second error rates to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

14. The invention of claim 13 further including the step of adjusting the write timing to provide a mark or space that is precisely spatially centered relative to said at least one spatial feature.

15. A method, comprising:
writing a data set, having a known error rate as a function of write timing, at an area on an optical disc that has spatial features arranged in accordance with the data set;
reading the data set;
measuring a read error rate;
comparing the read error rate to the known error rate as a function of write timing to determine a write timing error; and
using the write timing error to adjust the write timing to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

16. The invention of claim 15 further including the step of adjusting the write timing to provide a mark or space that is precisely spatially centered relative to said at least one spatial feature.

17. A system comprising:
means for writing a data set, with a write timing, at an area on an optical disc that has spatial features that distort an analog read data signal, the distortion varying as a function of write timing, where the data set has a characterized read error rate as a function of write timing at the area that has the spatial features;
means for reading the data set from the optical disc;
means for determining a read error rate for the data set; and
means for adjusting the write timing based on comparing the read error rate of the data set and the characterized read error rate as a function of write timing to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

18. The invention of claim 17 further including means for adjusting the write timing to provide a mark or space that is precisely spatially centered relative to said at least one spatial feature.

19. A system comprising:
means for writing a data set, with a write timing, at an area on an optical disc that has spatial features arranged in accordance with the data set;
means for reading the data set from the optical disc;

means for determining a first read error rate for the data set;
means for adjusting the write timing;
means for writing the data set at the area on the optical disc that has spatial features;
means for reading the data set from the optical disc;
means for determining a second read error rate for the data set;
means for selecting a lowest read error rate among the first and second read error rates; and
means for choosing a write timing corresponding to the lowest read error rate to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

20. The invention of claim 19 further including means for choosing the write timing to provide a mark or space that is precisely spatially centered relative to said at least one spatial feature.

21. A system comprising:
means for writing a data set, with a write timing, at an area on an optical disc that has spatial features arranged in accordance with the data set;
means for reading the data set from the optical disc;
means for determining a read error rate for the data set;
means for adjusting the write timing to provide a mark or a space on said disc that is precisely spatially located relative to at least one of said spatial features so that spatial features that would otherwise affect the timing of a transition of a binary read data signal if a transition between a mark and a space is near spatial feature, is not detectable in the binary read data signal inasmuch as the transition between a mark and a space is not near the spatial feature, and
means for repeating the preceding steps until the read error rate is less than a predetermined value.

22. The invention of claim 21 further including means for adjusting the write timing to provide a mark or space that is precisely spatially centered relative to said at least one spatial feature.

23. A system comprising:
means for writing a first data set, with a write timing, at an area on an optical disc that has spatial features that distort an analog read data signal, the distortion varying as a function of write timing;
means for writing a second data set, with the write timing, at an area on the optical disc that has spatial features that distort an analog read data signal, the distortion varying as a function of write timing;
means for reading the first data set and the second data set from the optical disc;
means for determining a first read error rate for the first data set, and a second read error rate for the second data set;
means for comparing the first and second error rates; and
means for adjusting the write timing based on the comparison of the first and second error rates to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

24. The invention of claim 23 further including means for adjusting the write timing to provide a mark or space that is precisely spatially centered relative to said at least one spatial feature.

25. A system comprising:
means for writing a data set, having a known error rate as a function of write timing, at an area on an optical disc that has spatial features arranged in accordance with the data set;
means for reading the data set;
means for measuring a read error rate;
means for comparing the read error rate to the known error rate as a function of write timing to determine a write timing error; and
means for using said write timing error to provide a mark or a space on said disc that is precisely spatially located relative to at least one of said spatial features so that spatial features that would otherwise affect the timing of a transition of a binary read data signal if a transition between a mark and a space is near the spatial feature, is not detectable in the binary read data signal inasmuch as the transition between a mark and a space is not near the spatial feature.

26. The invention of claim 25 further including means for using the write timing error to provide a mark or space that is precisely spatially centered relative to said at least one spatial feature.

* * * * *

UNITED STATES PATENT AND TRADEMARK OFFICE
CERTIFICATE OF CORRECTION

PATENT NO.         : 7,339,871 B2                                                Page 1 of 1
APPLICATION NO. : 10/610933
DATED              : March 4, 2008
INVENTOR(S)        : Josh Hogan It is certified that error appears in the above-identified patent and that said Letters Patent is hereby corrected as shown below:

On the title page, item (54), in "Title", line 2, after "OF" insert -- DATA --.

In column 1, line 2, in "Title", after "OF" insert -- DATA --.

In column 10, line 47, in Claim 2, insert -- further -- before "comprising".

In column 13, line 36, in Claim 21, after "near" insert -- the --.

In column 13, line 39, in Claim 21, after "feature" delete "," and insert -- ; --, therefor.

Signed and Sealed this

Seventh Day of April, 2009

JOHN DOLL
*Acting Director of the United States Patent and Trademark Office*